T. PEDERSEN.
FISHING TACKLE.
APPLICATION FILED JULY 27, 1909.
967,660.
Patented Aug. 16, 1910.
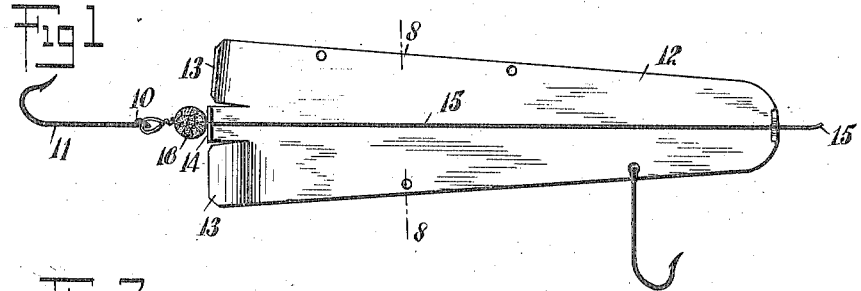
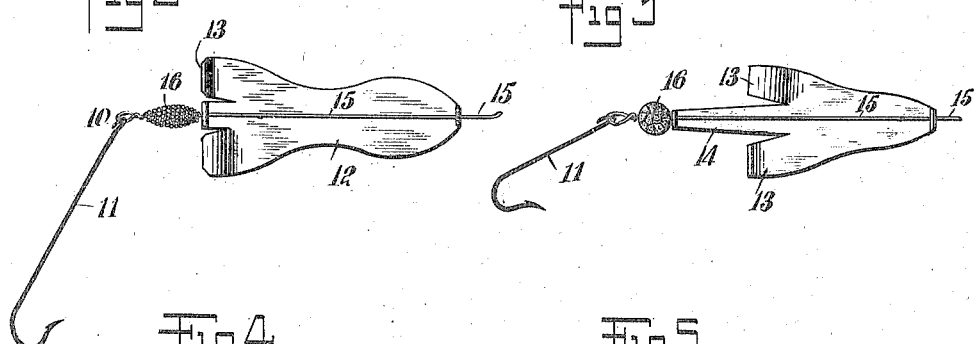
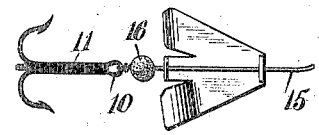
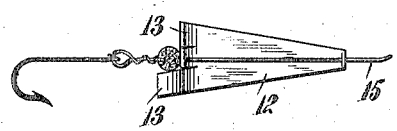
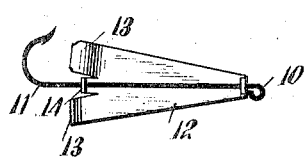
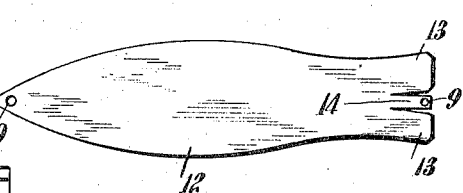
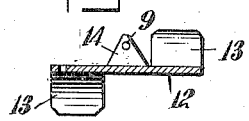
WITNESSES
INVENTOR
Thomas Pedersen
BY
ATTORNEYS

UNITED STATES PATENT OFFICE.

THOMAS PEDERSEN, OF WALLACE, IDAHO.

FISHING-TACKLE.

967,660.  Specification of Letters Patent.  Patented Aug. 16, 1910.

Application filed July 27, 1909. Serial No. 509,840.

*To all whom it may concern:*

Be it known that I, THOMAS PEDERSEN, a citizen of the United States, and a resident of Wallace, in the county of Shoshone and State of Idaho, have invented a new and Improved Fishing-Tackle, of which the following is a full, clear, and exact description.

Among the principal objects which the present invention has in view are: to provide a fishing tackle adapted to swirl and flash, the same being inexpensive and simple in construction; to provide a light reflecting and refracting attachment for the tackle; to provide a fishing tackle of a construction which may be readily packed within a small compass; to provide a construction whereby the same may be readily changed to vary the speed of operation; and to provide a construction whereby hooks may be attached to the swirling body of the tackle.

One embodiment of the present invention is disclosed in the structure illustrated in the accompanying drawings, wherein like characters of reference denote corresponding parts in all the views, and in which—

Figure 1 is a side view of the fishing tackle constructed in accordance with this invention and mounted upon a leader having a fish hook and decoy device thereon; Fig. 2 is a side view of a fishing tackle of slightly different form mounted upon a leader having a hook attached thereto and a decoy mounted thereon of different form than that shown in Fig. 1; Fig. 3 is a further modification of the form of the fishing tackle, the mounting being similar to that shown in Fig. 1; Fig. 4 is a view of a further modification of the construction as far as form is concerned; Fig. 5 is a modification of the form of the invention being shown in its simplified construction; Fig. 6 is a view of the construction as illustrated in Fig. 5 but as attached to the shank of a hook direct; Fig. 7 is a side view of a plank shaped and cut to form the lure; and Fig. 8 is a cross section of the tackle shown in Fig. 1, the section being taken on the line 8—8 in Fig. 1.

The lure as manufactured by me is constructed from suitable bright, light, reflecting material. They may be placed upon the market in their flattened shape, such as shown in Fig. 7 of drawings. They may be thus packed very closely and solidly within a small compass either in original packages or made up by the fisherman. At either end of the lure there are provided perforations 9, 9 through which it is purposed that a wire leader may be extended after being secured to the eye 10 of the hook 11. The lure is shaped so as to present a flat body portion 12 and two wings or tail pieces 13, 13.

When the devices are sold in the flat form, as shown in Fig. 7, the tails 13, 13 are bent at an angle to the body portion 12 and in opposite directions therefrom. Between the tails 13, 13 there is extended a tongue 14 which is bent upward to receive the leader 15. The forward end of the body portion 12 carrying the perforation 9 is also upward bent to aline with the perforation 9 in the tongue 14, and also to receive the leader 15. The two perforations thus being alined form a bearing on which the lure swirls when drawn rapidly through the water, being impelled thereto by the oppositely disposed tails 13, 13. It will be seen that the swirling of the lure is proportioned to the speed with which it be drawn through the water or the angle of inclination of the tails 13. As above stated, this angle may be altered to suit circumstances and desire. If it be found that best results are obtained by a comparatively slow moving lure having a high rate of rotation the tails are bent fairly acutely, while, on the other hand, if the rotation is desired to be slow the tails are flattened outward. With this lure the operation of the same is within the control of the fisherman, requiring no alteration in the operative parts of the lure in order to accomplish what he recognizes to be the need of the moment or to suit his desire.

The various forms illustrated in the drawings are to accommodate the many uses for which these lures are placed. In each, however, the general construction is the same in that the tongue 14 is provided at the one end and a narrowed extension at the other end, both the tongue and the narrowed extension carrying the perforations 9, 9 to have threaded therethrough the leaders 15 and to form a swirling bearing for the lure. In the form shown at Fig. 5 the tongue 14 is incorporated with the tail 13. This form may be used, but it is not that most preferred by me.

In conjunction with the lure I employ a decoy 16 which usually consists of a bright bead of some pronounced color having preferably a multiplicity of facets. When seen in the water the color of the bead lends life to the flashes from the lure. The decoy may be of any variety of shapes, colors and sizes. While I have shown the decoy 16 as detached from the lure I may, if desired, attach the same to the lure.

Having thus described my invention, what I claim as new and desire to secure by Letters Patent is:

A fishing tackle, comprising a body portion constructed from thin flat metal having a light-reflecting surface and having at the rear end thereof flat tail pieces adapted to be bent at an angle from the said body portion and on the opposite sides thereof, and provided with a tongue extension between the said tail pieces, said tongue being provided with a perforation and adapted to be bent at an angle to the said body portion, and further provided with a contracted forward end portion having a perforation and adapted to be bent at an angle to said portion to aline the said perforation therein with the said perforation in the said tongue.

In testimony whereof I have signed my name to this specification in the presence of two subscribing witnesses.

THOMAS PEDERSEN.

Witnesses:
M. L. McNEIL,
O. R. YOUNG.